United States Patent [19]

Toney

[11] Patent Number: 5,237,685
[45] Date of Patent: Aug. 17, 1993

[54] LINEAR RECURRENCE DISPERSAL STRUCTURE AND METHOD FOR PARALLEL PROCESSORS

[75] Inventor: Edward V. Toney, Exton, Pa.

[73] Assignee: International Business Machines Corporation, Armonk, N.Y.

[21] Appl. No.: 863,473

[22] Filed: Apr. 2, 1992

Related U.S. Application Data

[63] Continuation of Ser. No. 485,336, Feb. 26, 1990, abandoned.

[51] Int. Cl.$^5$ ............................................... G06F 1/00
[52] U.S. Cl. ................................................ 395/650
[58] Field of Search .............................. 395/800, 650; 364/200 MS File, 900 MS File, 735

[56] References Cited

U.S. PATENT DOCUMENTS

| | | | |
|---|---|---|---|
| 4,068,298 | 1/1978 | Dechant et al. | 364/200 |
| 4,649,498 | 3/1987 | Kedem et al. | 364/468 |
| 4,905,143 | 2/1990 | Takahashi et al. | 364/200 |

OTHER PUBLICATIONS

S. Lakshmivarahan and S. K. Dhall; New Parallel Algorithms for Solving First Order and Certain Classes of 2nd Order Linear Recurrences.

Primary Examiner—Roy N. Envall, Jr.
Assistant Examiner—Xuong Chung
Attorney, Agent, or Firm—John D. Crane; Charles B. Lobsenz; Robert L. Troike

[57] ABSTRACT

A substantial savings in computational time is realized by the use of plural parallel processing elements, each element having vector processing capabilities. The plurality of vector processor elements will concurrently perform calculations for a number of a groups of equations. The system determines the values of recurrent variables in a set of equations which define a linear recurrence in any order under program control by dividing said set of equations into groups of consecutive equations, determining temporary (or partial) values of the recurrence variables for each group with those recurrence variables which are derived in the equation in the next preceding group being set to zero, determining for each equation values of coefficients for those recurrence variables which were set to zero, and determining the final values of previously unsolved recurrence variables.

10 Claims, 11 Drawing Sheets

LRD PHASE 2, 1$^{ST}$ ORDER, STRIDE 4

$M^{TH}$ ORDER LINEAR RECURRENCE:

$$x_i = \sum_{j=i-m}^{i-1} a_{ij} x_j + b_i$$

FIG. 1A

1ST ORDER:

$$x_1 = b_1$$
$$x_2 = a_2 x_1 + b_2$$
$$x_3 = a_3 x_2 + b_3$$
$$\vdots$$
$$x_i = a_i x_{i-1} + b_i$$
$$\vdots$$
$$x_N = a_N x_{N-1} + b_N$$

FIG. 1B  *PRIOR ART*

2ND ORDER:

$$x_1 = \phantom{a_{2,1}x_1 + a_{3,1}x_1 +} b_1$$
$$x_2 = a_{2,1}x_1 \phantom{+ a_{3,1}x_1} + b_2$$
$$x_3 = a_{3,2}x_2 + a_{3,1}x_1 + b_3$$
$$x_4 = a_{4,3}x_3 + a_{4,2}x_2 + b_4$$
$$\vdots$$
$$x_i = a_{i,i-1}x_{i-1} + a_{i,i-2}x_{i-2} + b_i$$
$$\vdots$$
$$x_N = a_{N,N-1}x_{N-1} + a_{N,N-2}x_{N-2} + b_N$$

FIG. 2 PRIOR ART

M$^{TH}$ ORDER:

$$x_1 = \phantom{a_{2,1}x_1 + a_{3,1}x_1 + a_{4,1}x_1 +} b_1$$
$$x_2 = a_{2,1}x_1 \phantom{+ a_{3,1}x_1 + a_{4,1}x_1} + b_2$$
$$x_3 = a_{3,2}x_2 + a_{3,1}x_1 \phantom{+ a_{4,1}x_1} + b_3$$
$$x_4 = a_{4,3}x_3 + a_{4,2}x_2 + a_{4,1}x_1 + b_4$$
$$\vdots$$
$$x_i = a_{i,i-1}x_{i-1} + a_{i,i-2}x_{i-2} + \ldots + a_{i,i-m}x_{i-m} + b_i$$
$$\vdots$$
$$x_N = a_{N,N-1}x_{N-1} + a_{N,N-2}x_{N-2} + \ldots + a_{N,N-M}x_{N-M} + b_N$$

FIG. 3 PRIOR ART

PHASE 1

$$\begin{aligned}
x_1 &= b_1 \\
x_2 &= a_2 x_1 + b_2 \\
x_3 &= a_3 x_2 + b_3 \\
x_4 &= a_4 x_3 + b_4
\end{aligned}$$ GROUP 1

$$\begin{aligned}
x_5 &= a_5 x_4 + b_5 \\
x_6 &= a_6 x_5 + b_6 \\
x_7 &= a_7 x_6 + b_7 \\
x_8 &= a_8 x_7 + b_8
\end{aligned}$$ GROUP 2

$$\begin{aligned}
x_9 &= a_9 x_8 + b_9 \\
x_{10} &= a_{10} x_9 + b_{10} \\
x_{11} &= a_{11} x_{10} + b_{11} \\
x_{12} &= a_{12} x_{11} + b_{12}
\end{aligned}$$ GROUP 3

$x_N$ GROUP G

PHASE 2

$$\begin{aligned}
x_1 &= b_1 \\
x_2 &= a_2 b_1 + b_2 \\
x_3 &= a_3 a_2 b_1 + a_3 b_2 + b_3 \\
x_4 &= a_4 a_3 a_2 b_1 + a_4 a_3 b_2 + a_4 b_3 + b_4
\end{aligned}$$

$$\begin{aligned}
x_5 &= a_5 x_4 + b_5 \\
x_6 &= a_6 a_5 x_4 + a_6 b_5 + b_6 \\
x_7 &= a_7 a_6 a_5 x_4 + a_7 a_6 b_5 + a_7 b_6 + b_7 \\
x_8 &= a_8 a_7 a_6 a_5 x_4 + a_8 a_7 a_6 b_5 + a_8 a_7 b_6 + a_8 b_7 + b_8
\end{aligned}$$

$\uparrow C_8 \qquad \uparrow x_{8T}$ $$\begin{aligned}
x_9 &= a_9 x_8 + b_9 \\
x_{10} &= a_{10} a_9 x_8 + a_{10} b_9 + b_{10} \\
x_{11} &= a_{11} a_{10} a_9 x_8 + a_{11} a_{10} b_9 + a_{11} b_{10} + b_{11} \\
x_{12} &= a_{12} a_{11} a_{10} a_9 x_8 + a_{12} a_{11} a_{10} b_9 + a_{12} a_{11} b_{10} + a_{12} b_{11} + b_{12}
\end{aligned}$$

$\uparrow C_{12} \qquad \uparrow x_{12T}$

FIG. 4A

PHASE 3

GROUP 2
$$\begin{cases} c_5 = a_5 \\ c_6 = a_6 a_5 \\ c_7 = a_7 a_6 a_5 \\ c_8 = a_8 a_7 a_6 a_5 \end{cases}$$

GROUP 3
$$\begin{cases} c_9 = a_9 \\ c_{10} = a_{10} a_9 \\ c_{11} = a_{11} a_{10} a_9 \\ c_{12} = a_{12} a_{11} a_{10} a_9 \end{cases}$$

⋮

GROUP G
$$\{ c_N$$

PHASE 5

PHASE 4

LINEAR RECURRENCE DISPERSAL - 2ND ORDER

PHASE 1

GROUP 1:
$$x_1 =$$
$$x_2 = a_{2,1}x_1$$
$$x_3 = a_{3,2}x_2 + a_{3,1}x_1$$
$$x_4 = a_{4,3}x_3 + a_{4,2}x_2$$

GROUP 2:
$$x_5 = a_{5,4}x_4 + a_{5,3}x_3$$
$$x_6 = a_{6,5}x_5 + a_{6,4}x_4$$
$$x_7 = a_{7,6}x_6 + a_{7,5}x_5$$
$$x_8 = a_{8,7}x_7 + a_{8,6}x_6$$

GROUP 3:
$$x_9 = a_{9,8}x_8 + a_{9,7}x_7$$
$$x_{10} = a_{10,9}x_9 + a_{10,8}x_8$$
$$x_{11} = a_{11,10}x_{10} + a_{11,9}x_9$$
$$x_{12} = a_{12,11}x_{11} + a_{12,10}x_{10}$$

GROUP G:
$$x_N = \cdots$$

PHASE 2

$$b_1 = b_1$$
$$+b_2 = a_{2,1}b_1 + b_2$$
$$+b_3 = a_{3,2}a_{2,1}b_1 + a_{3,2}b_2 + a_{3,1}b_1 + b_3$$
$$+b_4 = a_{4,5}a_{3,2}a_{2,1}b_1 + a_{4,5}a_{3,2}b_2 + \cdots + b_4$$

$$+b_5 = c_{5,1} \quad \boxed{x_4} \quad +c_{5,2} \quad \boxed{x_3} \quad +x_{5t}$$
$$+b_6 = c_{6,1} \quad x_4 \quad +c_{6,2} \quad x_3 \quad +x_{6t}$$
$$+b_7 = c_{7,1} \quad x_4 \quad +c_{7,2} \quad x_3 \quad +x_{7t}$$
$$+b_8 = c_{8,1} \quad x_4 \quad +c_{8,2} \quad x_3 \quad +x_{8t}$$

$$+b_9 = c_{9,1} \quad \boxed{x_8} \quad +c_{9,2} \quad \boxed{x_7} \quad +x_{9t}$$
$$+b_{10} = c_{10,1} \quad x_8 \quad +c_{10,2} \quad x_7 \quad +x_{10t}$$
$$+b_{11} = c_{11,1} \quad x_8 \quad +c_{11,2} \quad x_7 \quad +x_{11t}$$
$$+b_{12} = c_{12,1} \quad x_8 \quad +c_{12,2} \quad x_7 \quad +x_{12t}$$

FIG. 5A

IN PHASE 1 AND 2:

$$x_5 = a_{5,4}x_4 + a_{5,3}x_3 + b_5$$
$$x_6 = \underbrace{(a_{6,5}a_{5,4} + a_{6,4})}_{c_{6,1}}x_4 + \underbrace{(a_{6,5}a_{5,3})}_{c_{6,2}}x_3 + \underbrace{a_{6,5}b_5 + b_6}_{x_{6t}}$$
$$x_7 = \cdots$$

FIG. 5B

LINEAR RECURRENCE DISPERSAL - 2ND ORDER

IN PHASE 2, $$x_{it} = a_{i,i-1}x_{i-1t} + a_{i,i-2}x_{i-2t} + b_i$$

$$\left( \begin{array}{ll} \text{FIRST IN GROUP:} & x_{it} = b_i \\ \text{SECOND IN GROUP:} & x_{it} = a_{i,i-1}x_{i-1t} + b_i \end{array} \right)$$

FIG. 5C

PHASE 3

$$c_{i,1} = a_{i,i-1}c_{i-1,1} + a_{i,i-2}c_{i-2,1}$$
$$c_{i,2} = a_{i,i-1}c_{i-1,2} + a_{i,i-2}c_{i-2,2}$$

$$\left( \begin{array}{l} \text{FIRST IN GROUP:} \\ c_{i,1} = a_{i,i-1} \\ c_{i,2} = a_{i,i-2} \end{array} \right)$$

$$\left( \begin{array}{l} \text{SECOND IN GROUP:} \\ c_{i,1} = a_{i,i-1}c_{i-1,1} + a_{i,i-2} \\ c_{i,2} = a_{i,i-1}c_{i-1,2} \end{array} \right)$$

FIG. 5D

PHASE 4

$$k_{1,2} = x_3 \quad k_{1,1} = x_4$$

PHASE 5

$$\begin{cases} x_5 = x_{5t} + c_{5,1}k_{1,1} + c_{5,2}k_{1,2} \\ x_6 = x_{6t} + c_{6,1}k_{1,1} + c_{6,2}k_{1,2} \end{cases}$$

$$\begin{cases} x_9 = x_{9t} + c_{9,1}k_{2,1} + c_{9,2}k_{2,2} \\ x_{10} = x_{10t} + c_{10,1}k_{2,1} + c_{10,2}k_{2,2} \\ \vdots \quad \vdots \\ x_N = \end{cases}$$

FIG. 5F

PHASE 1 - AS BEFORE, LARGER GROUPS NEEDED FOR LARGER M

PHASE 2 - WITHIN GROUP # $j, j \in [1:G]$ $$x_i = x_{it} + \sum_{t=1}^{M} c_{i,t} x_{F(j)+1-t}$$

PHASE 3: GENERAL EXPRESION FOR $c_{i,w}$ $1 \leq w \leq M$:

$$c_{i,w} = \sum_{t=1}^{M} a_{i,i-t} c_{i-t,w}$$

PHASE 4:

FOR EACH GROUP COMPUTE M VARIABLES:

$$k_{j,1 \, to \, M} = \sum_{t=1}^{M} c_{F(j),t} x_{F(j),F(t)-t} + x_{F(j,t)T}$$

PHASE 5:

$$x_i = x_{iT} + \sum_{t=1}^{M} c_{i,t} k_{F(j),t}$$

FIG. 6

LINEAR RECURRENCE DISPERSAL STRUCTURE AND METHOD FOR PARALLEL PROCESSORS

This application is a continuation of U.S. application Ser. No. 07/485,336, filed Feb. 26, 1990, to Edward V. Toney, entitled Linear Recurrence Dispersal Structure and Method for Parallel Processors, assigned to the same assignee as this patent application, now abandoned.

BACKGROUND

1. Field of the Invention

This invention relates to an improved method and apparatus for rapidly solving Mth order linear recurrences on a data processing system using a unique linear recurrence dispersal technique. The invention can be practiced on a parallel processor or a uniprocessor or parallel processor having vector processing features.

2. Prior Art

In general, computation time for arithmetic problems in a data processing system is a function of the number of equations to be solved and the number of processors available to receive and process information. Solving an Mth order linear recurrence has heretofore been done serially where $x_1$ is solved, then $x_2$ is solved by plugging in $x_1$ from the previous equation, and then solving $x_3$ by plugging in $x_2$, etc.

The inventor is aware of at least one attempt to solve a first order linear recurrence of length N by the Computing Research Group at the Lawrence Livermore Labs. Their technique requires approximately $1.5N\log_2 N$ arithmetic operations to solve the first order linear recurrence of length N, which offers a vector operation count of $3 \log_2 N$. This method, referred to as Recursive Doubling, appears to require $0.3 \log_2 N$ times the amount of time needed to solve a first order recurrence than the time required using the linear recurrence dispersal technique disclosed herein. Wherefore, recursive doubling appears to have a greater computational requirement than the linear recurrence dispersal technique disclosed herein, rendering the linear recurrence dispersal technique the preferred alternative.

SUMMARY OF THE INVENTION

The instant invention teaches the use of the linear recurrence dispersal technique to solve mth order linear recurrences, preferably on a parallel processor, to yield a significant reduction in computation or "turnaround" time from that realized by prior art execution on parallel processors. Further, the method can be utilized with a data processing system using a parallel processor with vector features for further reduction in turnaround time.

The invention disclosed herein is to a method for determining the values of recurrence variables in a set of equations which define a linear recurrence of any order on a data processing system comprising the following five steps of:

(a) dividing said set of equations into groups of consecutive equations, (b) determining temporary (or partial) values, for each group, of the recurrence variables with those recurrence variables which are derived from equations in the next preceding group being set to zero, (c) determining for each equation the values of coefficients for those recurrence variables which were set to zero, (d) determining the final values of said recurrence variables which were set to zero, and (e) determining the final values of previously unsolved recurrence variables.

It is a principal object of the instant invention to utilize a linear recurrence dispersal technique to solve linear recurrences of any order on a processor to yield a significant reduction in turnaround time. The technique is preferably executed on a parallel processor system having vector processing elements for optimum performance.

It is also an object of the present invention to use the improved linear recurrence dispersal technique to solve linearly recurring equations of any order with concurrent processing of equations in all groups to substantially reduce computation time.

It is another object of the present improvement to use stride S addressing of values to substantially improve overall performance for certain calculation sequences.

In accordance with these and other objects which will be apparent hereinafter, the instant invention will now be described with particular reference to the accompanying drawings.

BRIEF DESCRIPTION OF THE DRAWINGS

FIG. 1A shows an Mth order linear recurrence to which the linear recurrence dispersal technique of the instant invention proposes an expeditious solution FIG. 1B shows a first order linear recurrence expressed as N recurrence variables to be solved.

FIG. 2 shows a second order linear recurrence expressed similarly to the first order linear recurrence of FIG. 1B.

FIG. 3 depicts an Mth order linear recurrence.

FIG. 4A shows a set of first order linear recurrence equations broken up into G groups of four equations in each group, setting forth the phase 1 and phase 2 steps of the linear recurrence dispersal method.

FIG. 4B illustrates the phase 3 through 5 calculations of the instant invention for the first order recurrence of FIG. 4A.

FIG. 5A shows a set of second order linear recurrence equations broken up into G groups of four equations per group and showing the phase 1 and phase 2 steps of the linear recurrence dispersal method.

FIG. 5B illustrates how the coefficients $C_{6,1}$ and $C_{6,2}$ and $X_{6T}$ are formed in the phase 3 calculation of the instant invention for the second order recurrence of FIG. 5A.

FIG. 5C shows a generalized phase 2 equation and how $X_{iT}$ is determined for the second order recurrence.

FIG. 5D shows the generalized formula representation for determining the values of C in phase 3 for the second order recurrence.

FIG. 5E shows the generalized formula representation for determining values of k in phase 4 in the second order linear recurrence.

FIG. 5F shows the generalized representation for the phase 5 calculation of the final linear recurrence variable solutions in a second order linear recurrence.

FIG. 6 shows certain of the generalized representations of an Mth order linear recurrence equation for phases 1 through 5.

DESCRIPTION OF THE PREFERRED EMBODIMENTS

Figure 7:
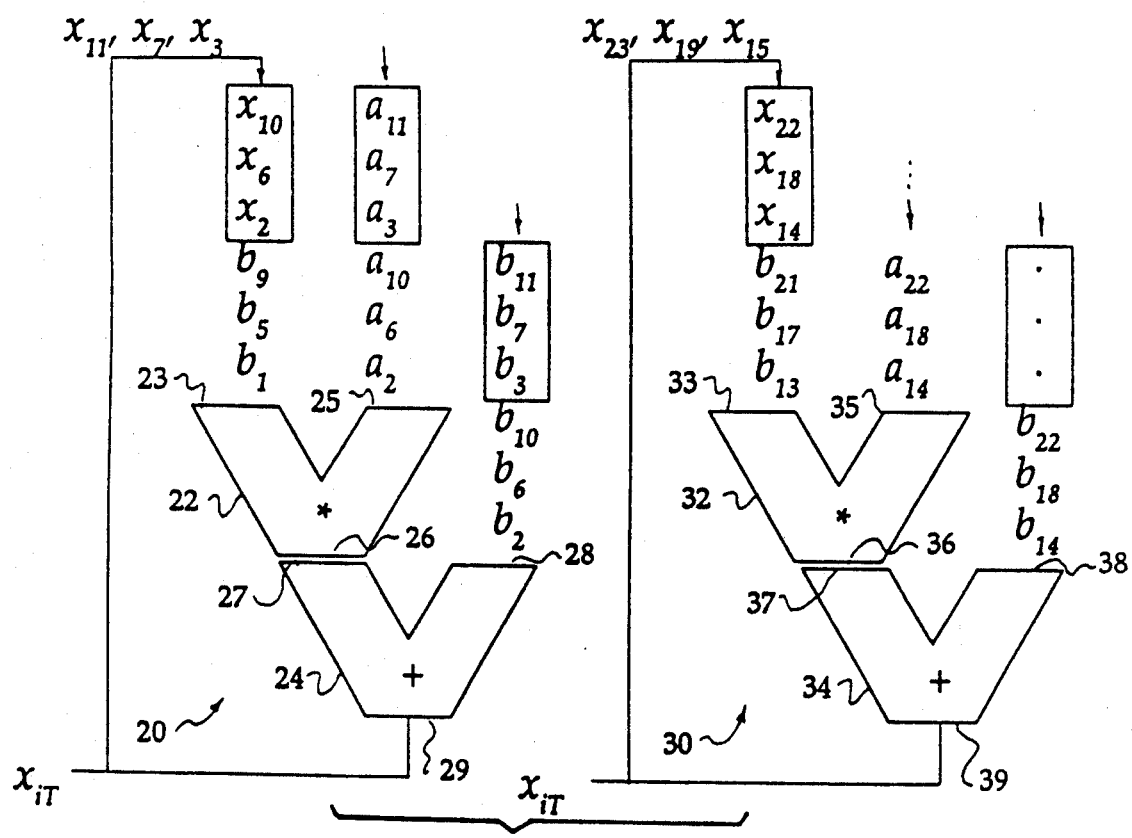
FIG. 7 diagramatically illustrates a pair of parallel vector processing elements and the movement of data within said elements as they process data in groups 1-3 and 4-6 (not shown) of FIG. 4A.

Referring now to the drawings, FIG. 1A shows the generalized depiction of an Mth order linear recurrence, wherein the solutions to equations $x_1$ through $xN$ are desired. As best shown in FIG. 1B, it has heretofore been necessary, in order to calculate solutions to the $X_i$ variables sometimes referred to hereinafter as recurrence variables, to solve the successive equations by calculating $X_1$, then plugging the value of $X_1$ into the $X_2$ equation, then plugging the derived $X_2$ value into the $X_3$ equation, and so on in scalar fashion. Because a solution for the next succeeding equation cannot be calculated before the previous equations have been solved, the prior art technique is very time consuming. Equations are shown in generalized and fragmentary form because of their significant complexity.

FIG. 2 depicts a second order linear recurrence shown as N equations. Such recurrences have heretofore also been solved by the less efficient method described with respect to FIG. 1B above.

FIG. 3 shows the generalized depiction of an Mth order linear recurrence broken into N equations. For any order linear recurrence, the solution is time consuming when performed using the prior art scalar solution technique.

Before describing the linear recurrence dispersal method of the present invention, a brief description of the data processing environment within which it may be practiced will be given. The method may be practiced in a uniprocessor or parallel processor system, obviously with significant performance differences. In either type system, stride S addressing capabilities and vector processing elements will significantly enhance performance.

Figure 8:
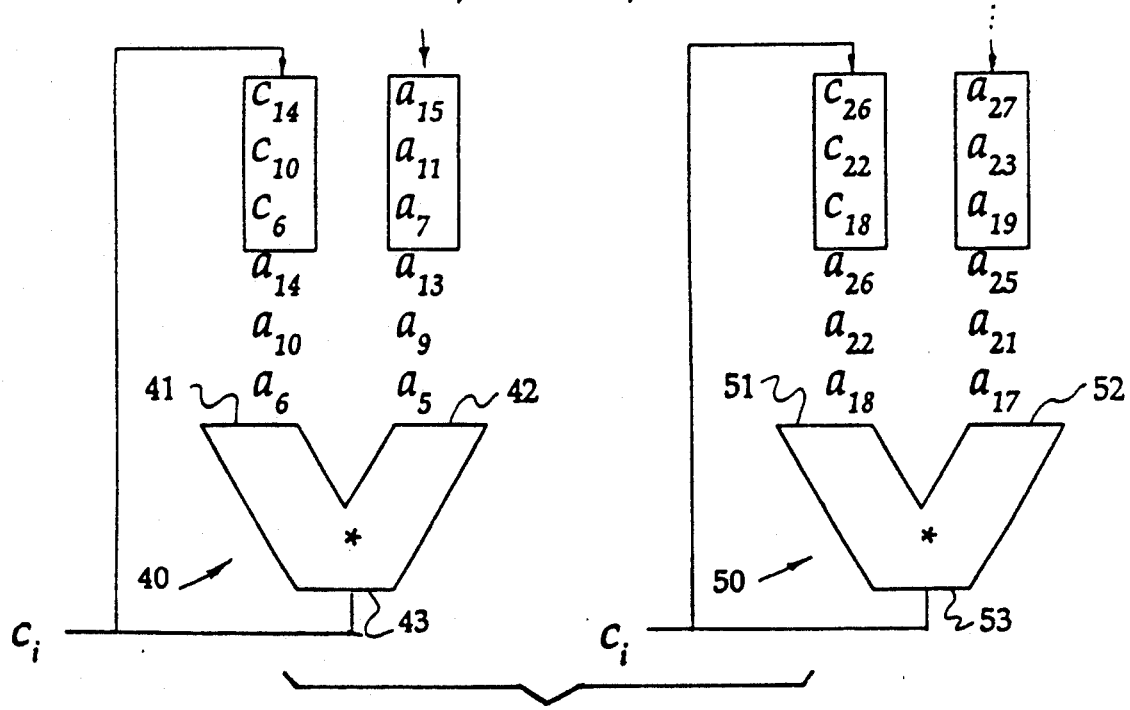
FIG. 8 demonstrates the use of a pair of parallel vector processing elements to calculate phase 3 values of C using the linear recurrence dispersal technique to solve the recurrence of FIG. 4A.
Figure 9:
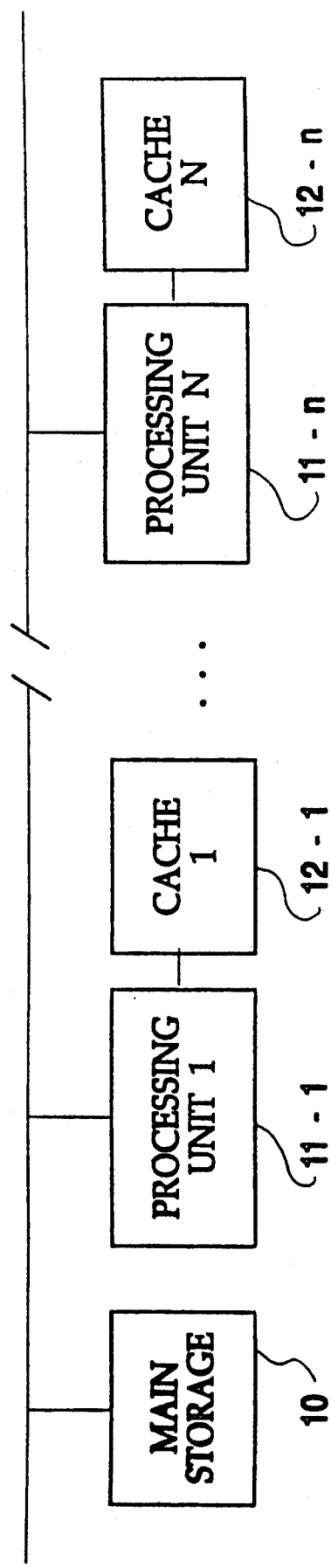
FIG. 9 shows a diagramatic illustration of a parallel data processing system with a main storage and processor units 1 through N, each shown with respective cache memory.

Thus, FIG. 9 diagrammatically illustrates a preferred embodiment, a parallel processing system with a main storage 10 and a plurality of processing units 11-1 to 11-n, each shown with respective cache memory 12-1 to 12-n. The processing units can, in a preferred embodiment, perform complex vector processing and each processing unit such as 11-1 may have multiple processing elements such as 20, 30, 40 and 50 shown in FIGS. 7 and 8. Various processing units and their vector processing elements may be assigned various phase 1-5 tasks under program control in a well known manner.

FIGS. 4A and 4B show the Phase 1-5 steps of the first order linear recurrence dispersal method of the present improvement. In phase 1 the N equations which comprise the recurrence are broken up into G groups of, in the instant embodiment, but not by way of limitation, four equations per group. A substantial savings in computation time is realized by the use of plural parallel processor elements, each possessing vector processing capabilities.

In the preferred embodiment, the plurality of vector processor elements will concurrently perform calculations for a number of groups of equations. The computation time will vary with the number of processors used.

As will be seen below with respect to FIG. 7, phase 2 calculations will be made across groups, e.g. $x_1$, $x_5$, $x_9$, $x_2$, $x_6$, $x_{10}$, $x_3$ etc. in one processing element in the preferred embodiment. The result of this sequence is that $x_4$ is not solved when the first (temporary) calculation of $x_5$ is performed. This sequence is referred to herein as stride 4 addressing.

According to the instant invention, the linear recurrence variables in the set of equations which define a linear recurrence of any order are calculated by the following five step process:

(a) dividing said set of equations into groups of consecutive equations;

(b) determining (calculating) temporary values, for each group, of the recurrence variables, with those recurrence variables which are derived from equations in the next preceeding group being set to zero (it being assumed that their value is unknown at the time of the calculation);

(c) determining, for each equation, values of coefficients for those recurrence variables which were set to zero;

(d) determining the final values of said recurrence variables which were set to zero; and (e) determining the final values of previously unsolved recurrence variables.

For purposes of this disclosure, the steps (a) through (e) shall correspond to phases 1 through 5, respectively.

Referring to phase 1 (FIG. 4A), all N equations are broken up into G groups, each group having, preferably, an equal number of equations per group (eg: 4). Referring to phase 2 (FIG. 4A) the solution of the group 1 equations is straightforward in the preferred embodiment because the sequence of calculations ($x_1$, $x_5$, $x_9$, $x_2$ . . . ) permits $x_1$ to have been solved and available for solving $x_2$ during phase 2. However, in groups 2 through G, the $x_{i-1}$ to $x_{i-m}$ recurrence variables that appear on the right side of the equal sign in Phase 1 of that group are set equal to zero because they are unknown during phase 2. For example, in phase 2, group 2, $x_4$ is temporarily set equal to zero because it appears in the preceding group (group 1), is unknown, and also appears in the group under consideration (group 2). This step yields a temporary or "partial" value of the recurrence variables in group 2, Phase 2. This process is carried out through all groups 2-G. For example, the "temporary" value of $x_8$, shown in group 2, and designated "$X_{8T}$" is:

$$a_8 a_7 a_6 b_5 + a_8 a_7 b_6 + a_8 b_7 + b_8$$

because $x_4$ is temporarily set equal to zero, nullifying the coefficient of $x_4$ in group 2, Phase 2. For purposes of explanation, the temporary value of $x_5$ in group 2, Phase 2, designated $x_{5T}$, is $b_5$. Similarly, the temporary value of $x_6$, designated $x_{6T}$, becomes:

$$a_6 b_5 + b_6$$

The temporary value ($X_{7T}$) for $x_7$ is therefore:

$$a_7 a_6 b_5 + a_7 b_6 + b_7$$

Therefore, it can be seen that in step (b), or Phase 2, arithmetic calculations are carried out wherein a temporary or "partial" value is given to each $x_i$ because of the error caused by artificially setting variables to 0. That is, by assigning a temporary value of zero to the recurrence variable (or variables, for second or greater order recurrences) which appears on the right side but not on the left side of the equal sign in that group, an $x_{iT}$, or temporary recurrence value is obtained to be used in the calculations of Phases 4 and 5. The approximation resulting from the step of setting certain values momentarily equal to zero to calculate temporary values of the recurrence variables is carried out preferably by parallel processor element using stride 4 addressing in FIG. 7. Solutions in one group will later be used in calculations with solutions from the other groups, but are not presently known to each other. The results of the phase 2 calculations in each of the processor elements can be put in general purpose registers and/or in the cache memory 11-1 or main store 10 shown in FIG. 9, i.e. the temporary values given to each $x_{iT}$ in groups 2 through g and the actual values of $x_1$ through $x_4$ calculated in group 1.

In step (c), or phase 3 (FIG. 4B), the coefficients C which correspond to the recurrence variables, which were set equal to zero in phase 2 (FIG. 4A), are developed, in general M per equation for groups 2 through G, and it can be done concurrently with step (b). The process can also be vectorized as shown in FIG. 8 with stride 4 addressing across groups. Note that the stride 4 addressing is across different groups in FIGS. 7 and 8.

As seen in FIG. 4B, ]n phase 4, the final values $k_i$ of the recurrence variables which were set to zero in phase 2 are computed in sequence. This is the one phase that requires scalar processing since each computation requires the results of the previous computation; hence it is desirable to keep the number of computations at a minimum for phase 4. In phase 5, the coefficients computed in phase 3 are multiplied by the appropriate constants of phase 4 and the results added to the appropriate temporary recurrence values $x_{iT}$ of phase 2 to yield the final values of the recurrence variables. The groups may be processed in parallel with vector processing elements operated at stride 1.

In phase 1, the total number of equations to be solved are broken into groups of equal numbers of equations. For example, for a group of 1,000 equations, where there are four processors available to carry out calculations, G may be set equal to 4 and the group of 1,000 equations broken up into four groups of 250 equations each. This results in the improved method being substantially less complicated than the original problem.

The approximate speed-up in performance of a computer utilizing the improved method and apparatus on a scalar n-way machine is $N/(m+2)$ where m=the order of the linear recurrence and N=the number of processors. Using a stride 1 vector n-way machine, the increase is approximately $n/(m+1)$.

FIGS. 5A through depict the linear recurrence dispersal technique disclosed herein carried out on a second order linear recurrence. FIG. 5A shows the breakdown of the N equations of the linear recurrence into G groups in Phase 1, and in Phase 2 temporary values $x_{iT}$ are calculated for the recurrence variables.

Thereafter, as shown in FIG. 5B, and in a manner analagous to that exemplified above for a first order recurrence, the $C_{ij}$ coefficients corresponding to the recurrence variables temporarily set equal to zero are calculated and it can be appreciated from FIG. 5B that the value of $x_{6T}$ is as follows:

$$a_{6,5} b_5 + b_6$$

because $x_4$ and $x_3$ are temporarily set equal to zero as they appear in the preceding group and on the right side of the equal sign in that group (group 2) but do not appear on the left side of the equal sign in the group under consideration (group 2). It is also to be appreciated from FIG. 5B that the value of $x_{5T}$ equals $b_5$.

The generalized phase 2 $x_{iT}$ calculation is set forth in FIG. 5C for the second order linear recurrence presently under consideration.

FIG. 5D shows the generalized Phase 3 calculation of the C coefficients for a second order linear recurrence. As can be seen in FIGS. 5B and 5D, the coefficients of the recurrence variables which were taken as zero in any particular group are represented by the coefficient C.

FIG. 5E shows a portion of the Phase 4 calculation of the k coefficients for a second order linear recurrence. These coefficients are then utilized in the calculation of the final recurrence variables in Phase 5 as depicted in FIG. 5F.

It should be noted that the five steps or phases of the linear recurrence dispersal technique disclosed herein are identical for first, second or Mth order linear recurrences alike; and therefore each calculation step is performed in like manner regardless of the order of the recurrence. It should also be noted that, for any order recurrence, the final values of the group 1 recurrence variables are known at the end of phase 2 and that the recurrence variables in groups 2 through G are dependent upon the values of the recurrence variables in group 1 and require calculation through all five phases to reach solutions. Thus, in the examples shown in FIGS. 5A through 5F, equations $x_1$ through $x_4$, comprising group 1, are solved at the end of Phase 2, whereas equations $x_5$ through $x_N$ are not solved until Phase 5.

The term "stride" as used herein refers to the accessing of memory, wherein each succeeding address value is determined by incrementing by the stride value (eg. 1 to S). Therefore, stride 1 indicates that each succeeding address is one unit distant from the next preceeding address. Likewise, stride S indicates that each succeeding address is S units distant from the next preceeding address. A stride S processor can substantially improve performance over a stride 1 processor with faster accessing of data.

FIG. 6 shows the generalized expression for the five steps or phases of the linear recurrence dispersal method for an Mth order equation, which is merely an extension of the first and second order examples set forth in FIGS. 4A through 5F. All five steps are carried out in the manner already described.

FIG. 7 shows a diagrammatic representation of a pair of parallel vector processing elements 20 and 30 depicting the movement of data within said elements 20 and 30 for phase 2 calculations required in the first order embodiment of FIG. 4A. As described earlier, in the preferred embodiment, the data processing system on which the linear recurrence dispersal technique is carried out should have effective processing capability such that Phases 2 and 3 can be achieved with vector processing and with calculations performed across groups with a stride equal to the number of equations in a group. The output of the vector processing element 20 is the $x_{iT}$ temporary recurrence variable values which are stored temporarily in general purpose registers (not shown) or cache 11-1 of FIG. 9 or main storage.

The multiplier logic element 22 has two inputs 23 and 25 and an output 26 coupled to a first input 27 of addition logic element 24, which element 24 has a second input 28. The output 29 of addition logic element 24 is coupled directly to cache 12 or main storage 10 shown in FIG. 9 and is also coupled to the stream of data connected to input 23 of multiplier logic element 22.

Similarly, multiplier logic element 32 of vector processing element 30 has a pair of inputs 33 and 35 and an output 36 coupled to first input 37 of addition logic element 34, which has a second input port 38. Addition logic element 34 has output port 39 coupled directly to cache memory as well as being connected to the input port 33.

As evidenced by the subscripts on the a and b coefficients entering input ports 23, 25 and 28 of FIG. 7, the stride of the system depicted is 4. That is, the processing element 20 is calculating values for the first three groups of FIG. 4A and the next processing element 30 is calculating values for the second three groups.

FIG. 7 and the table below illustrate a preferred method of executing phase 2 calculations of the first order linear recurrence of FIG. 4A. In a typical vector processing element 20, the result of a multiplication in logic 22 (eg: $b_1 a_2$) can be added to the appropriate value (eg: $b_2$) while the next values ($b_5$, $a_6$) are being applied to the inputs 23, 25. This improves system performances.

However, note that the values applied to the inputs 23, 25, 28 (FIG. 7) in succession are found in the equations of next succeeding groups (stride 4), eg. $x_1$, $x_5$, $x_9$, $x_2$, $x_6$ ... rather than succeeding equations of the same group (stride 1). If equations of the same group were processed in order (stride 1), then for example the results of the calculation of $x_2$ would not be available at the input 23 (FIG. 7) when the calculation of $x_3$ is initiated. Depending upon the hardware of the system, stride 1 processing would necessitate the processing element 20 being rendered inactive until the $x_2$ calculation is complete and the value of $x_2$ being fed directly to the input 23 or put in a general purpose register which register is then accessed to provide the value of $x_1$ to the input 23. In addition, the application of $x_2$ to the input 23 must be coordinated with the application of values $a_3$ and $b_3$ to respective inputs 25, 28. Thus one or more cycles of operating time are lost to the processing element 20 if stride 1 processing is used.

To avoid this system inefficiency, stride S (in FIG. 7 stride 4) addressing is used in a preferred embodiment to access $b_1$, then $b_5$, $b_9$... etc. This is illustrated in greater detail in the following table for the first three groups of equations:

| CYCLE | VARI-ABLE | RESULTS OF CALCULATION | |
|---|---|---|---|
| 1 | $x_1$ | $= b_1$ | |
| 2 | $x_{5T}$ | $= 0 + b_5$ | |
| 3 | $x_{9T}$ | $= 0 + b_9$ | |
| 4 | $x_2$ | $= a_2 x_1 + b_2$ | where $x_1 = b_1$ |
| 5 | $x_{6T}$ | $= 0 + a_6 x_{5T} + b_6$ | $x_{5T} = b_5$ |
| 6 | $x_{10T}$ | $= 0 + a_{10} x_{9T} + b_{10}$ | $x_{9T} = b_9$ |
| 7 | $x_3$ | $= a_3 x_2 + b_3$ | $x_2 = a_2 b_1 + b_2$ |
| 8 | $x_{7T}$ | $= 0 + a_7 x_{6T} + b_7$ | $x_{6T} = a_6 b_5 + b_6$ |
| 9 | $x_{11T}$ | $= 0 + a_{11} x_{10T} + b_{11}$ | $x_{10T} = a_{10} b_9 + b_{10}$ |
| 10 | $x_4$ | $= a_4 x_3 + b_4$ | $x_3 = a_3 a_2 b_1 + a_3 b_2 + b_3$ |
| 11 | $x_{8T}$ | $= 0 + a_8 x_{7T} + b_8$ | $x_{7T} = a_7 a_6 b_5 +$ |

-continued

| CYCLE | VARI-ABLE | RESULTS OF CALCULATION | |
|---|---|---|---|
| 12 | $x_{12T}$ | $= 0 + a_{12} x_{11T} + b_{12}$ | $a_7 a_6 + b_7$ $x_{11T} = a_{11} a_{10} b_9 + a_{11} b_{10} + b_{11}$ |

It can be seen from the table that there is no processing element delay. For each variable (eg $x_2$) is calculated three cycle times its preceding variables ($x_1$) is calculated; hence $x_1$ is at the appropriate time for the $x_2$ calculation irrespective of the system characteristics. Although the preferred embodiment shows a stride 4 corresponding to the four (4) equations for group, the invention is not so limited. It is merely important to provide a stride value which does not cause the processing element 20 to wait (miss cycles) for a previous calculation result and/or coefficient before initiating its next calculation cycle.

FIG. 8 shows the use of a vector processing element 40, which in the case shown is a multiplier logic element, to calculate the Phase 3 values of Ci using the linear recurrence dispersal technique on the first order recurrence of FIGS. 4A, 4B. The multiplier logic element 40 has a pair of input ports 41 and 42 and an output port 43, which output port 43 is connected to cache memory 12 or main storage 10 shown in FIG. 9. Comparing FIG. 8 to FIG. 4B., Phase 3, it can be seen that coefficients $a_6$ and $a_5$ are about to be input into input ports 41 and 42 of multiplier logic element 40, respectively. Therefore, the output therefrom will be a value of $C_6$. Likewise, the next pair of coefficients, $a_{10}$ and $a_9$, to be multiplied by multiplier logic element 40 will yield a product designated as $C_{10}$ in the next succeeding group. Thus, it can be seen that the stride of the system is four allowing a single processor to calculate across a plurality of groups (2, 3 and 4). It can thus be appreciated that the next succeeding operation will multiply coefficients $a_{14}$ and $a_{13}$, the result of which will be designated as $C_{14}$, the value produced in Group 3 (not shown).

It will also be appreciated that certain special cases exist wherein less calculation is required. For example, where the $a_{i,j}$ coefficient are all constant (ie: where $a_{i,j}=a$) the phase three computations no longer make up a significant portion of the solution because they are performed only once for the second and succeeding groups.

Another example exists where the $a_{i,j}$ coefficients all equal one. The phase three computations do not need to be performed for first order and there is significant reduction in calculations for other orders.

A third example of a special case exists where the $a_{i,j}$ coefficients equal $a_{i+t,j}$, or periodic coefficient, wherein the phase three computations need not be a significant portion of the solution if the group size is chosen appropriately.

It will be appreciated that practice of the invention requires the use of the five phases described above. However, it will be appreciated that the manner of executing at least certain phases will depend upon the hardware and software available. That is, execution of certain phases will depend upon the availability of: (1) stride 1 to stride S addressing, (2) the number of processors and (3) whether the system being used has vector processing capability.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A multiprocessor data processing system comprising:
   a) a plurality of processor elements, each one of said processor elements having a coupling interface means through which data is communicated to and from each processor element;
   b) a plurality of first storage elements having coupling interfaces through which data is communicated to and from said storage elements, said storage elements being accessible to each of said processor elements;
   c) first control means for dividing a set of equations into groups of consecutive equations and further allocating processing of said groups between said plurality of processor elements;
   d) second control means operating at one of said plurality of processor elements concurrently with at least one other of said plurality of processor elements, said processor elements including at least one pair of parallel vector processing elements further including a multiplier logic element having two inputs and an output coupled to a first input of an addition logic element which has a second input, each processing element determining temporary values of recurrence variables of said groups of consecutive equations by setting those recurrence variables which are derived from equations in a next preceding group to zero;
   e) third control means operating at one of said plurality of processor elements concurrently with at least one other of said plurality of processor elements, said processor elements including at least one pair of parallel vector processing elements further including an addition logic element which has two inputs and one output, each processing element determining for each equation, values of coefficient for those recurrence variables which were set to zero;
   f) fourth control means operating at one of said plurality of processor elements to determine final values of recurrence variables which were set to zero;
   g) fifth control means operating at one of said plurality of processor elements concurrently with at least one other of said plurality of processor elements, each processing element determining the final values of previously unsolved recurrence variables; and
   h) second storage means for storing each of the temporary values and final values as determined by the first through fifth control means.

2. The multiprocessor data processing system of claim 1 wherein said first storage elements are 3. The multiprocessor data processing system of claim 1 wherein said first control means includes means for arranging the groups of consecutive equations into subsets of groups of consecutive equations and wherein said second control means includes means for determining temporary values of recurrence variables for each subset of groups, operating stride S, in a sequence in which the temporary values of the first equations in each group of the subset are calculated in sequence followed by the temporary values of the second, then the following equations in each group of the subset.

4. The multiprocessor data processor system of claim 3 wherein said vector processing elements perform the temporary value determinations of said subsets of groups of consecutive equations concurrently with each other.

5. The multiprocessor data processing system of claim 3, wherein said first control means includes means for arranging the groups of consecutive equations into subsets of groups of consecutive equations and wherein said third control means includes means for determining said coefficient values for each of said subsets in a sequence in which the coefficient values of the first equations in each group of the subset are calculated in sequence followed by the coefficient values of the second, then the following equations in each group of the subset.

6. The multiprocessor data processing system of claim 5 wherein said vector processing elements perform the coefficient value determinations of said subsets of groups of consecutive equations concurrently with each other.

7. A method of operating a data processing system having a plurality of processing elements and a system memory for more efficiently determining values of recurrence variables in a set of equations which define a linear recurrence of any order comprising the steps of:
   (a) separating said set of equations into groups of consecutive equations,
   (b) determining concurrently in separate processors, temporary values, for each group, of recurrence variables by setting recurrence variables which are derived from equations in a next preceding group to zero, one said processor being assigned to determine temporary values of recurrence variables for each said group of consecutive equations.
   (c) determining concurrently in separate processors, coefficient values, for each equation in each group, of those recurrence variables which were set to zero, one said processor being assigned to determine coefficient values for each equation in each group of consecutive equations,
   (d) determining final values of said recurrence variables which were set to zero,
   (e) determining final values of previously unsolved recurrence variables, and
   (f) storing each of the determined temporary and final values in the system memory after each respective determining step.

8. The method of claim 7 wherein consecutive equations are arranged in subsets of consecutive groups of consecutive equations, and
   wherein memory is addressed stride S for performing said temporary value determinations of each subset of groups in a sequence in which temporary values of first equations in each group of a subset are calculated in sequence followed by temporary values of second equations in each group, then remaining in sequence, equations in each group of the subset being calculated.

9. The method of claim 8 wherein S coincides with the number of equations in a group.

10. The method of claim 7 wherein consecutive equations are arranged in subsets of consecutive groups of consecutive equations, and
   wherein said coefficient value determinations for each of said subsets are performed by a processor element in a sequence in which the coefficient values of the first equations in each group of the subset are calculated in sequence followed by the coefficient values of the second, then the remaining, in sequence, equations in each group of the subset.

* * * * *